Patented Mar. 24, 1931

1,797,901

UNITED STATES PATENT OFFICE

ELTON R. DARLING, OF DANVILLE, ILLINOIS, ASSIGNOR TO PACIFIC LUMBER COMPANY, OF CHICAGO, ILLINOIS, A CORPORATION OF MAINE

MANUFACTURE OF SHEATHING LUMBER FROM REDWOOD BARK

No Drawing.     Application filed June 22, 1929.  Serial No. 373,053.

The present invention relates to a process for the conversion of the bark of the redwood or Sequoia tree into commercial forms of sheathing lumber, wall board and the like.

One of the objects of the invention is to convert the bark into said sheathing lumber while retaining the entire tannin content of the bark so that the same may have enhanced durability and resistance to fire and wood-destroying insects, the further object being to improve the water-proofing qualities of the said board.

This process comprises the treatment of the bark from redwood trees. These trees, which grow to enormous heights, are the largest trees in the world, and have bark that averages from 8 to 27 inches in thickness. The bark is almost incombustible and contains a material apparently very repulsive to insects, so that in the forests where these trees grow there is no bird life, because there are no insects upon which the birds may feed.

This property of redwood bark is taken advantage of in the process for producing a sheathing board or lumber which will be proof against the inroad of rodents, termites, and ants and other wood-destroying insects. In this respect the material is unique. It is also inherently fire-resistant and is said to burn only with considerable difficulty and not to be a free supporter of combustion, so that board made therefrom does not represent the same fire hazard as does board made from bagasse fibres. While not burning with a free flame, it appears that the material when once ignited shows a distinct tendency to smolder, acting in this respect very much like punk.

Formerly it was the custom to fell the trees in the woods and to bark them at that point, and eventually after the bark had dried out sufficiently, to burn it up with branches and other wood waste. This, however, was quite a task and the recent perfection of lumbering operations enables the transportation of felled trees with their bark about them directly to the lumber mill. At this point the trees are de-barked by mechanical means.

Heretofore, the only uses made of this material have been attempts to burn it in the woods, or else to make it into a rough sort of board, as disclosed in the patent to John K. Shaw, No. 1,468,036, which makes a board, the outside of which consists of shredded redwood bark and the inside of which consists of bagasse fibres. Another patent, No. 1,349,112 of H. P. Weiss, makes a mat of the fibres of the redwood in their original length covered with a covering material, such as canvas, and then tied together into bundles.

The present process is quite distinct from what is shown in either of these two patents, as it leads to the production of a board in which the fibres are comparatively strongly compressed so as to produce a sheathing board.

As an exemplification of the manner in which the process is to be carried out, it may be stated that after the felled logs arrive at the lumber mill they are mechanically debarked so as to separate the bark from the wood of the trees. This bark is then run through the regular standard hogging mill which converts it into comparatively small individual chips which are then passed through a shredding device which may also be of standard manufacture, in order to produce a comparatively loose shredded product.

In my co-pending application Serial No. 372,224, filed June 19, 1929, I have described a process for the conversion of redwood bark into sheathing lumber wherein the bark is treated for the removal therefrom of an associated material which for want of a better name I have designated as "tree sand", and wherein the fibres of the bark are treated under pressure with an alkaline solution for conversion into a fibre from which wall board or sheathing board may be manufactured. In the said co-pending application I have also described the preliminary treatment of the bark by means of leaching in water in order to remove therefrom the therein contained tannin and tannic acid and its recovery.

By my present invention, however, I do not attempt to remove the said tannin, but prefer the same substantially unchanged in the fibre and in the finished product made therefrom. In carrying out the process of my present invention, I proceed as follows:

I employ as the raw material, the bark of the trees after the hogging of the same, as above described, or just as it is removed from the logs when they arrive at the lumber mill. In that case the bark is first cut into lengths of such size that they may readily be fed into a machine which reduces the bark to an open or shredded condition. The slabs of bark are then fed into the shredding machine in such manner that the fibres in the opposite direction to the path of the shredding mechanism, for by thus operating the material is shredded but the fibres are not torn, cut or broken.

As already mentioned there is associated with the fibre a small quantity of a raw material consisting of little round black particles which I have designated as "tree sand". For the preparation of a proper type of sheathing board it is desirable to remove this "tree sand". The shredding operation just described serves to loosen this "tree sand" which may then be removed from the separated and loosened fibres by a dry screening operation. After passing through a screening machine, wherein the "tree sand" passing through the gyrating, oscillating or rotating sieve is thus mechanically separated from the fibres, the latter are then run through through a defibering machine which further loosens the fibres and separates the same more completely. This operation consists in passing the material between two rapidly revolving plates in the presence of a substantial amount of water, the mixture of water and fibres leaving the said machine being run into vats provided with agitating means, whereupon additional water is added until the ratio of stock to water is such as to produce a substantially uniform freely flowing suspension. This suspension of fibre is then passed over wet screens having interstices fine enough to retain the fibre but coarse enough to pass the residual "tree sand" although an alternative method is to pass the same through riffle tanks where the fibre is kept in suspension but the "tree-sand" is allowed to settle out.

Having thus obtained a suspension of comparatively pure fibres free from the "tree-sand" these fibres are then subjected to digestion under pressure in a solution containing a chemical capable of combining with the tannin contained in the bark fibres, and some of which tannin exists in solution in the liquid portions of the suspension. It has been found that a chemical capable of forming a colorless insoluble tannate is particularly desirable as thereby the color of the fibre remains unchanged, with the further advantage that the waste liquors resulting from the digestor are practically water white and may be run into screens without causing polution. In order to carry out this step of the invention there is employed a solution of aluminum sulphate or its equivalent such as antimony or other chemical salt capable of forming colorless insoluble tannates. The best results are obtained by employing a solution of aluminum sulphate of $\frac{1}{2}\%$ strength to which the fibres are subjected while contained in a steam tight digester for a period of two hours at a pressure of 75 pounds above atmospheric. The percent of strength and time of pressure give are not to be constructed as limiting but are given as an illustration of one of the best methods of carrying out the invention. The ratio of the chemical solution to the fibre when based on such strength as hereinabove given is about five parts of solution to one part of fibre. The digestion is best carried out in a rotary type of digester wherein the material is subject to constant agitation by reason of rotation of the digestor.

After the digestion is complete, the pressure is blown off the digester, and its contents discharged into a tank where they are diluted with additional water and then are freed from the liquid portions of the resulting suspension by a screening operation such as, for example, by passing the fibres over Oliver filters or similar chemical filtration equipment. The fibres are washed on the said filters and are then placed in a heater and treated therein with a size such as alum and rosin soap, and are then passed over a standard board forming machine, as is well known in the art of formation of board from other fibres.

The solution separated from the fibres need not be discarded but after an analysis to determine the residual aluminum sulphate, or other chemical, therein, may be refortified with the same chemical to bring it up to the initial strength of one-half percent.

The board resulting from this process is of a pleasing brown color and has superior mechanical strength to one made by the alkaline digestion process. The nature of the redwood bark, which is inherently resistant to insects and other wood-attacking vermin, renders the same particularly valuable for use in such parts of the world where wood-destroying insects live. The board is particularly useful for sheathing and may also be employed for wall board, as it readily takes the coating of plaster, cement or stucco.

While I have described the use of aluminum sulphate specifically I again wish to point out that other equivalent chemicals capable of forming substantially colorless tannates may be employed such for example as an antimony salt. Of course, if color is desired, I may also employ such salts as copper sulphate. In such case, however, the operation could not be carried out in an iron apparatus unless the same were first copper plated or otherwise treated to prevent the removal of the copper from the solution. For all practical purposes aluminum sulphate is the cheapest and therefore the most desirable. The exact sequence of the operations, especially as relates to the removal of the "tree-sand" need not be followed, but the invention is to be construed in accordance with the hereunto appended claims and their relation to the art of converting redwood bark into wall board and the like. I might mention at this point that instead of forming the fibres into a board the same may be allowed to dry loosely when they will form an excellent fibrous material possessing superior bonding strength than cotton flock and useful as a filler in plastic materials. I desire to include within the scope of my invention the utilization of the fibres for such purposes as well.

The essential feature of the present invention resides in the digestion of the bark in a solution of a chemical capable of forming an insoluble compound with the tannins in the bark.

What I claim is:

1. Individual fibres of redwood bark containing the insoluble tannate of the tannin compounds present in redwood bark.

2. The process of treating redwood bark for the separation of the fibres thereof which comprises boiling said bark in a solution of a salt capable of forming insoluble tannates.

3. The process of treating redwood bark for the separation of the fibres thereof which comprises boiling said bark in a solution of a salt capable of forming colorless insoluble tannates.

4. The process of treating redwood bark for the separation of the fibres thereof which comprises boiling said bark in a solution of aluminum sulphate.

5. The process of treating redwood bark for the separation of the fibres thereof which comprises boiling said bark in a solution containing ½% of aluminum sulphate.

6. The process of preparing sheathing boards from redwood bark which comprises comminuting said bark, dry-sieving most of the therein contained "tree-sand" therefrom, grinding the fibres thereof in water, thereupon wet-sieving the fibres to remove the balance of the "tree-sand" therefrom, and thereupon boiling said fibres under pressure in a solution of a chemical capable of forming insoluble tannates, washing said boiled fibres and sizing the same and forming a compact board therefrom, and drying and seasoning the latter.

7. The process of preparing sheathing boards from redwood bark which comprises comminuting said bark, dry-sieving most of the therein contained "tree-sand" therefrom, grinding the fibres thereof in water, thereupon wet-sieving the fibres to remove the balance of the "tree-sand" therefrom, and thereupon boiling said fibres under pressure in a solution of a chemical capable of forming colorless insoluble tannates, washing said boiled fibres and sizing the same and forming a compact board therefrom, and drying and seasoning the latter.

8. The process of preparing sheathing boards from redwood bark which comprises comminuting said bark, dry-sieving most of the therein contained "tree-sand" therefrom, grinding the fibres thereof in water, thereupon wet-sieving the fibres to remove the balance of the "tree-sand" therefrom, and thereupon boiling said fibres under pressure in a solution of aluminum sulphate, washing said boiled fibres and sizing the same and forming a compact board therefrom, and drying and seasoning the latter.

9. The process of preparing sheathing boards from redwood bark which comprises comminuting said bark, dry-sieving most of the therein contained "tree-sand" therefrom, grinding the fibres thereof in water, thereupon wet-sieving the fibres to remove the balance of the "tree-sand" therefrom, and thereupon boiling said fibres under pressure in a ½% solution of aluminum sulphate, washing said boiled fibres and sizing the same and forming a compact board therefrom, and drying and seasoning the latter.

10. Sheathing board comprising redwood fibres containing insoluble compounds of the tannins present in natural redwood bark.

In witness whereof, I have hereunto subscribed my name.

ELTON R. DARLING.